Aug. 4, 1953  M. A. STICELBER  2,647,612
DOUGH TRANSFER DEVICE FOR LOAF MOLDING APPARATUS
Filed Jan. 26, 1948  2 Sheets-Sheet 1

Inventor
MERLIN A. STICELBER
By Alfred R. Fuchs
Attorney

Aug. 4, 1953    M. A. STICELBER    2,647,612
DOUGH TRANSFER DEVICE FOR LOAF MOLDING APPARATUS
Filed Jan. 26, 1948    2 Sheets-Sheet 2

Inventor
MERLIN A. STICELBER
Alfred R. Fuchs
Attorney

UNITED STATES PATENT OFFICE 2,647,612

DOUGH TRANSFER DEVICE FOR LOAF MOLDING APPARATUS

Merlin A. Sticelber, Kansas City, Mo., assignor to Stickelber & Sons, Inc., a corporation of Missouri Application January 26, 1948, Serial No. 4,294

13 Claims. (Cl. 198—20)

My invention relates to transverse curling loaf molding mechanisms for molding loaves of bread and similar bakery products.

In order to improve the texture of loaves of bread it has been found desirable to curl the sheeted pieces of dough transversely of the direction in which the same have been sheeted. This transverse curling of the sheeted pieces of dough results in a more uniform grain of the baked loaf, eliminating the occasional large holes that develop in the loaf during the proofing operation when such transverse curling is not performed.

However, considerable difficulty is encountered in connection with molding a loaf of bread by a transverse curling operation, because of the manner in which the sheeted pieces of dough have to be handled in order to present the same to a transverse curling mechanism, the difficulty that is involved being particularly the presentation of the sheeted piece of dough to the curling mechanism and to the pressure board, which is part of the molding machine, in such a manner as to obtain a loaf of bread that is of uniform cross sectional size from end to end thereof and to feed the completely molded loaf of bread to a panning device in such a manner as to have the loaf located properly in the pan.

In molding machines making use of a transverse curling operation, the sheeting mechanism discharges the sheeted piece of dough with considerable momentum across a conveyor belt that operates transversely to the conveyor leading from the sheeting mechanism, and means has to be provided to prevent the sheeted piece of dough from not feeding flatly to the conveyor belt, such means, preferably, comprising a stop plate, which is engaged by the piece of dough that is thrown transversely across the conveyor belt so as to direct the piece of dough or deflect the piece of dough downwardly into engagement with the upper surface of the conveyor belt.

While such a stop plate will prevent the piece of dough from being presented otherwise than flatwise to the conveyor belt and prevent the dough piece from passing entirely across and off the conveyor belt, the pieces of dough are discharged onto said conveyor belt so that the forward edge of the piece traveling from the sheeting mechanism will pass different distances across the conveyor belt that carries the sheeted piece of dough transversely of its first direction of movement to the curling mechanism and the pressure board.

While it has been customary to provide guides for the curled pieces of dough that pass under the pressure board so as to limit the elongation of the rolled-up or curled-up piece of dough and maintain a predetermined length of the molded loaf, and also to locate the curled or rolled-up pieces of dough centrally of the pressure board, such guides fail to serve their purpose unless the piece of dough that has been discharged onto the conveyor belt that moves transversely of the sheeting mechanism conveyor is located on the said transversely operating conveyor belt after it comes to rest thereon always in the same location transversely of the belt for each succeeding piece of such sheeted dough and is presented substantially centrally of said guide members to said guide members to be fed under the pressure board.

It is a purpose of my invention to provide stop means for the piece of sheeted dough, being transferred from the conveyor that extends from the sheeting mechanism to the conveyor that forms part of the curling mechanism, so that the forward edge of the piece of dough, which becomes the one side edge during the curling operation, will always be located at a fixed location transversely of the conveyor belt that is part of the curling mechanism.

It is specifically a purpose of my invention to provide stop means of the above mentioned character in an apparatus comprising transverse curling means and a pressure board that comprises adjustable guide means for directing the sheeted piece of dough into proper relationship with the curling mechanism, so that the curling mechanism will curl or roll up the piece of dough on itself uniformly from end to end thereof, and to further guide the piece of dough into engagement with the pressure board so as to have the rolled-up or curled piece of dough centrally located between the guide members that guide the pieces of dough while passing under the pressure board.

It is another important purpose of my invention to provide combined stop and guide means for the sheeted pieces of dough, that is adjustable independently of the adjusting means for the guides that cooperate with the pressure board so that said combined stop and guide member can be adjusted to any desired position relative to the guiding means that cooperate with the pressure board, and so that said guiding means that cooperate with the pressure board can be adjusted to any desired relative position and any desired angular relationship to each other independently of the combined stop and guiding means that locates the one side edge of the piece of sheeted dough that is to be curled and subjected to action of the pressure board.

Other objects and advantages of my invention will appear as the description of the drawings proceeds. I desire to have it understood, however, that I do not intend to limit myself to the particular details shown or described, except as defined in the claims.

Figure 1:
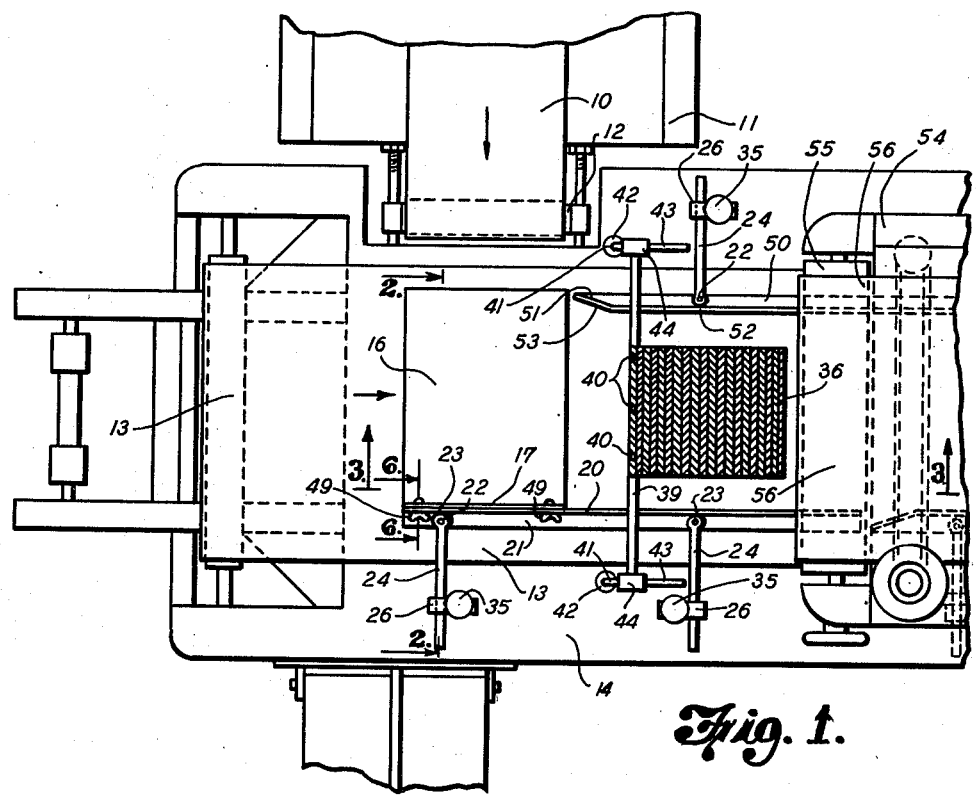
Fig. 1 is a fragmentary top plan view of a loaf molding apparatus to which my invention is applied.
Figure 2:
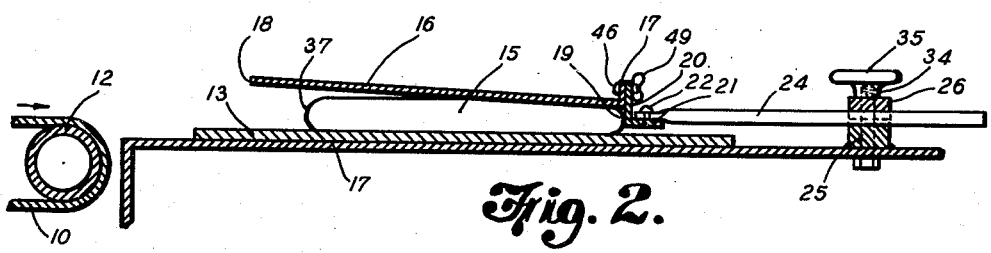
Fig. 2 is a fragmentary sectional view taken on the line 2—2 of Fig. 1, on an enlarged scale.

Referring in detail to the drawings, in Fig. 1 is shown a portion of a bread molding machine that has a conveyor belt 10 mounted on a suitable frame 11 and operating over a roller 12, which is adjustably mounted on the frame, said conveyor belt extending from suitable sheeting mechanism, which is not shown, but which may be of any standard or desired character. The conveyor belt 10 travels in the direction indicated by the arrow in Figs. 1 and 2 and discharges pieces of sheeted dough therefrom across the conveyor belt 13, which operates in the direction of the arrow thereon in Fig. 1. The conveyor belt 10 discharges said pieces of dough with considerable momentum off the end thereof toward the right as viewed in Fig. 2 and across the conveyor belt 13. The conveyor belt 13 extends across a table-like member 14, which is mounted on a suitable frame, and the tendency of the sheeted pieces of dough, indicated by the numeral 15 in Fig. 2, is to travel somewhat upwardly away from the conveyor belt 13, as the same are discharged with considerable momentum from the conveyor belt 10.

In order to prevent undesirable upward movement of the sheeted pieces of dough away from the conveyor belt 13, which might prevent the flatwise engagement of the sheeted pieces of dough with the conveyor belt when the same finally engage therewith, a stop plate 16 is provided, which is of substantially the width of the conveyor belt 10 and extends across a large portion of the width of the conveyor belt 13 and is generally rectangular in character, having a marginal flange 17 thereon that extends at an angle that is slightly oblique to the body portion 16 of said plate so that when said plate is secured in position, as described below, the marginal edge 18 of said plate that is nearest the conveyor belt 10 will be inclined upwardly above the edge thereof that has the upstanding flange 17. As a result the plate 16 acts as effective guiding means and deflecting means to direct the sheeted pieces of dough 15 downwardly into engagement with the conveyor belt 13 so as to rest flatly thereon upon engagement with said conveyor belt 13. However due to the fact that the conveyor belt 10 will act differently in its action of throwing the sheeted pieces of dough 15 across the belt 13, dependent upon the amount of flour that may be on the dough pieces and on the conveyor belt 10, the leading or forward edge 19 of the sheeted piece of dough passing under the plate 16 would not always be located at the same place relative to the longitudinal side edges of the conveyor belt 13, if some means were not provided for stopping the dough piece 15 at a predetermined point in its transverse movement. Accordingly, stop means is provided that is so located that the pieces of dough that would be thrown with the least force across the conveyor belt 13 will always reach said stop means and the pieces of dough that would be thrown across the belt 13 with greater force will, of course, also stop at said stop means.

The stop means, preferably, comprises an angular guide member 20, which has a horizontal flange 21 that is pivotally connected by pivot members 22 with enlargements 23 on the end portions of rod-like members 24, said rod-like members being mounted in suitable brackets 25 that are provided with clamping means for adjustably securing the rod-like members in position. The clamping means comprise an upper member 26 that is provided with a partly circular groove 27 therein that aligns with a similar groove 28 in the bracket 25. The members 25 and 26 are also provided with aligning openings 29 and 30, through which a bolt-like clamping member 31 extends, which has a head 32 thereon, on the under side of the table-like member 14, and a washer 33 may be mounted between said head 32 and the under side of the table 14. If desired, the washer-like member 33 and the head 32 can be secured together and the member 33 fixed to the under side of the table-like member so that said parts will be held against rotation and thus the bolt-like member 31 will be held against rotation relative to the table-like member 14. A nut 34 having an enlargement 35, by means of which the same can be readily rotated, engages the screw-threaded end 36 of the bolt-like member 31 and the upper surface of the member 26 to serve as means for clamping the rod-like member 24 in the grooves 27 and 28.

It will be obvious from the above that the angular members 20 can, by adjustment of the rod-like members 24 in the brackets 25, be adjusted transversely of the belt 13 and by adjustment of the clamping members 26 transversely of the conveyor belt 13, be held in such adjusted position. The adjustment can be such, if desired, that the angular stop member, which also serves as a guide member, as will be described below, extends either parallel to the longitudinal side edge of the conveyor belt 13 or at any desired angle thereto, as the members 24 are independently adjustable.

Figure 3:
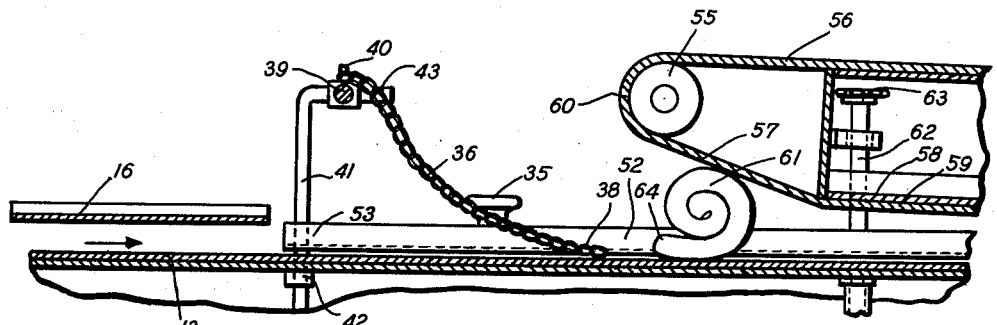
Fig. 3 is a fragmentary sectional view taken on the line 3—3 of Fig. 1, on an enlarged scale.
Figure 4:
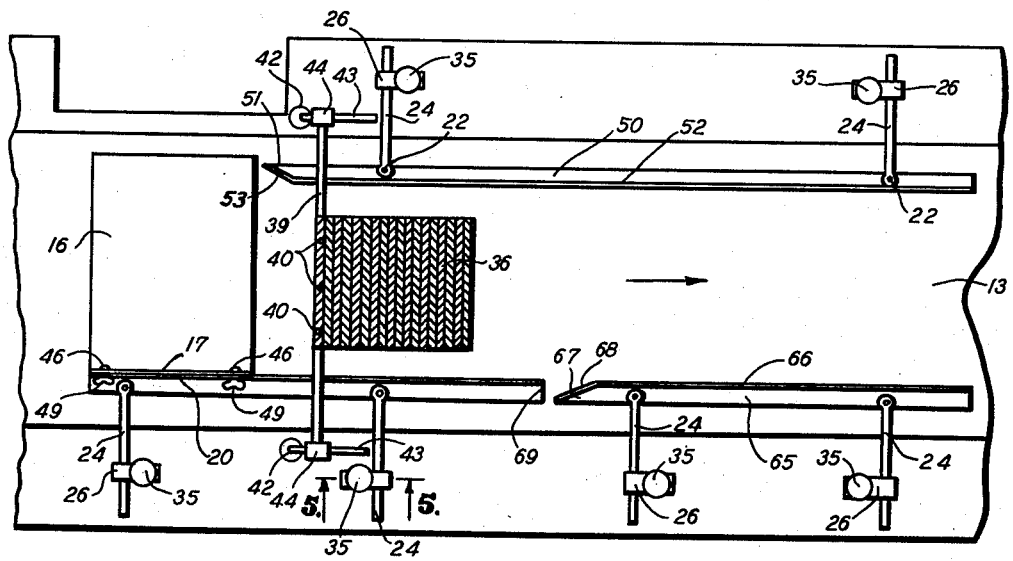
Fig. 4 is a fragmentary plan view of the curling mechanism conveyor and the curling member and guides, with the pressure board omitted.
Figure 5:
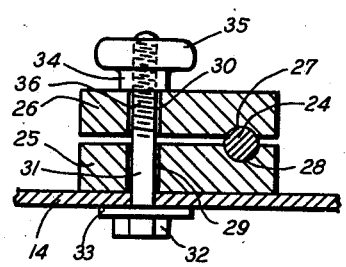
Fig. 5 is a detail sectional view, on an enlarged scale, taken on the line 5—5 of Fig. 4.
Figure 6:
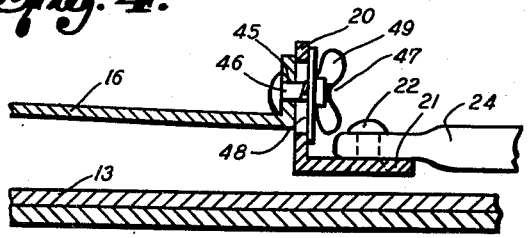
Fig. 6 is a similar view taken on the line 6—6 of Fig. 1.

It will be obvious from the above that the dough pieces that have been sheeted, such as the sheeted dough piece 15, will all thus be located at the same location transversely of the belt 13 when the transverse movement of the dough piece 15 ceases, due to being discharged from the conveyor belt 10, provided, of course, that the stop and guide member 20 is adjusted so as to be in such a position that all of said pieces of dough 15 will reach the stop and guide member 20. The pieces of dough being so located, will all engage the flexible curling member 36 in the same manner and with the side edges of the sheeted dough pieces 15, which were the forward edges 19 and rear edges 37 of the piece of dough as it was traveling along the conveyor belt 10, so located that the curling member 36 will engage with its center line substantially on the center line of the piece of sheeted dough that is to be curled thereby. This centering of the dough pieces relative to the curling means can be accomplished by adjustment of the guide member 20 and by adjustment of the flexible curling member 36. The flexible curling member is of a flexible chain mesh material and has its lower extremity 38 dragging on the conveyor belt 13 so that when dough pieces that have been sheeted engage therewith the leading edges of said dough pieces will be turned over on the dough piece and this curling over or turning over action will continue until the dough piece has been completely curled-up or rolled-up on itself substantially as shown in Fig. 3, after having passed completely under the curling member 36, the conveyor belt 13 traveling in the direction indicated by the arrow in Fig. 3. The curling member 36 is suspended from a transverse bar 39 and is mounted on a plurality of pins 40 that project upwardly from this transverse bar. It will be obvious that the flexible curling member can be adjusted on the bar 39 so as to get the desired location thereof relative to the side edges of the conveyor belt and relative to the guide member 20 by lifting the portion thereof that engages over the pins off said pins and moving it crosswise of the conveyor belt 13 and again engaging it with the pins 40 to get the desired location thereof so that said curling member 36 will be centered relative to the dough pieces that are approaching the same to be curled.

The curling member 36 is adjustable so as to vary the inclination thereof relative to the conveyor belt and the amount thereof that will drag on the conveyor belt, as well as its location lengthwise of the conveyor belt by the mounting shown in the drawings, which comprises a pair of standards 41 that are mounted in suitable brackets 42 so as to be vertically adjustable in said brackets and held in adjusted position in said brackets by suitable clamping means, to thus locate the upper angular end portions 43 of said standards at a desired height above the top surface of the conveyor belt 13. Suitable brackets 44 are adjustably mounted on the angular portions 43 of the standards 41 and are provided with suitable means for holding the same in adjusted position so that the rod-like member 39 mounted in said brackets 44 can be adjusted lengthwise of the conveyor belt 13 and thus the flexible curling member 36 can also be adjusted lengthwise of the conveyor belt 13. The specific mounting of the flexible curling member 36 can be varied as may be found desirable, as long as the curling member is adjustable crosswise, lengthwise and in height at its supported edge relative to the conveyor belt 13.

The spacing of the deflector and stop plate 16 relative to the conveyor belt 13 is also adjustable, the flange 17 thereon being provided with openings 45 therein through which the headed securing elements 46 extend, which are threaded at 47 and extend through slots 48 in the member 20, said slots extending vertically of said member 20, and suitable means for clamping said member 16 in adjusted position being provided, such as the wing nuts 49 engaging the threaded portions 47 of the members 46. Thus the position of the stop plate 16 relative to the combined stop and guide member 20 can be adjusted and consequently also the position of the plate-like member 16 can be adjusted relative to the conveyor belt 13 to thus obtain the proper location for the plate-like member 16 to deflect the sheeted pieces of dough 15 and direct the same into engagement with the conveyor belt 13 face to face.

A guide member 50 is provided, which has a beveled end portion 51 at its forward end, and which is provided with an upstanding flange 52 that has an obliquely extending portion 53 at the beveled end 51 of said guide member, said guide member being mounted on the frame of the machine by means of rod-like members 24 that are the same in construction as those previously described and are similarly connected with the guide member 50 by means of pivot members 22 and are adjustable in a similar manner by means of clamping members that are mounted in the same manner as above described on the machine and clamp the rod-like members 24 in adjusted position in the same manner as above described. It will accordingly be obvious that the guide member 50 can be adjusted transversely of the conveyor belt 13 and can either extend parallel to the side edge thereof or be inclined to the side edge so as to have the forward end thereof further inward than the rear end thereof, or vice versa, as may be found desirable to obtain the desired guiding action thereof relative to the curling member 36 and the pressure board to be described below.

The pressure board is indicated generally by the numeral 54 and has a roller 55 mounted at its forward end, over which a belt 56 extends. The belt 56 is normally stationary, but can be moved when this is desired in order to present different portions thereof for engagement with the curled-up pieces of dough. The belt has an inclined portion 57 that extends from the roller 55 to the flat under face 58 of the pressure board and then has a portion 59 that extends parallel to said flat under face. Thus the pressure board has a beveled forward end that has a rounded portion 60 and a downwardly inclined surface 57 that is engaged by the curled-up dough piece 61 in substantially the manner indicated in Fig. 3. As the curled-up piece of dough 61 passes along the inclined surface 57 the pressure board is raised, this being possible due to the fact that the pressure board is mounted for sliding movement up and down on standards 62, which are provided with adjustable stop members 63 for limiting the upward movement of the pressure board. The pressure board normally engages with the dough pieces by the action of gravity, pressing down on the dough pieces so as to firmly seal the adjacent surfaces of the layers or plies of dough in the curled-up piece together and eventually firmly sealing the closing edge 64 of the curled-up piece to the adjacent body portion thereof. The curled-up piece of dough rolls over on its own longitudinal axis a number of times in passing along under the pressure board, because of the dragging action exerted by the pressure board and the forward movement of the rolled-up dough piece, due to the action of the conveyor belt 13. After this rolling action occurs there is a tendency for the dough piece to elongate itself as well as to seal the adjoining surfaces of the rolled-up piece of dough to each other.

In order to limit the elongation of the dough piece the guide member 50 has cooperating therewith a guide member 65, which is similar to the guide member 50 having an upwardly directed flange 66 on the inner side thereof and a beveled forward end 67 that has an inclined flange 68 thereon, and which is considerably shorter than the guide member 50, said guide member 65 lying entirely under the pressure board. The guide member 50, however, extends forwardly from the pressure board to near the plate-like member 16 so that it longitudinally is in overlapping relation to the guide member 20. Said guide member 20 has its rear end 69 extending to near the forward tapering end 67 of the guide member 65. The guide member 65 is mounted by means of the rod-like members 24 in the same manner as the guide members 20 and 50 to thus be adjustable transversely of the conveyor belt, and it will be obvious that the rod-like members 24 are capable of independent adjustment so that the guide member 65 can either extend parallel to the guide member 50, parallel to the longitudinal side edge of the conveyor belt 13, or can be in either converging or diverging relation to the guide member 50 in the direction of travel of the conveyor belt 13 as may be found desirable in order to form a molded loaf of the desired length and to guide said loaf into proper relationship to a suitable panning device, which may be provided beyond the pressure board.

It will be obvious that the member 20 serves both as a guide member and as a stop member, first halting the transverse travel of the dough piece 15 due to the momentum that it has upon discharge from the conveyor 10, and then guiding the dough piece in its travel lengthwise of the conveyor belt 13 so that said dough piece will engage with its longitudinal center line substantially on the longitudinal center line of the curling member 36 so that the rolled-up or curled-up piece of dough forming the loaf will be of the same cross section from end to end thereof and not thicker at one end and thinner at the other end thereof, as would be the case if the dough piece were not centered relative to the curling member. It will also be obvious that the guide member 20 can be adjusted independently of the guide members 65 and 50, which are also adjustable independently of each other, so that the adjustment of the guide members 50 and 65 can be made to get the desired length of molded loaf or curled-up piece of dough after passing under the pressure board, and said guide member 20 adjusted so as to place the end 69 thereof in such a position relative to the beveled end of the guide member 65 that the dough pieces that have been curled by the curling mechanism 36 will be arranged with the ends of the curled-up piece engaging with the flanges 60 and 52 so as to be guided centrally under the pressure board.

By providing the beveled or inclined forward end wall 57 on the pressure board, the curled or rolled-up pieces of dough 61 will engage therewith so as to more gradually raise up the pressure board and prevent any possibility of the piece of dough being engaged by the pressure board in such a manner as to be stopped in its forward movement caused by the belt 13, which might cause mutilation of the molded loaf, but instead will begin the rolling action that is produced by means of the pressure board, while at the same time gradually raising the pressure board upwardly from the conveyor belt as the curled-up piece of dough travels to the right as viewed in Fig. 3.

What I claim is:

1. In a molding machine, a conveyor for sheeted pieces of dough, a conveyor belt traveling transversely of the direction of travel of said first conveyor and receiving pieces of dough discharged crosswise thereof from said first conveyor, a plate-like member extending over said conveyor belt to direct said pieces of dough toward said belt and a stop member for limiting movement of said pieces of dough transversely of said belt.

2. In a molding machine, a conveyor for sheeted pieces of dough, a conveyor belt traveling transversely of the direction of travel of said first conveyor and receiving pieces of dough discharged crosswise thereof from said first conveyor, a plate-like member extending over said conveyor belt in spaced relation thereto to direct said pieces of dough toward said belt, means for adjusting the spacing of said plate-like member from said belt, a stop member for limiting movement of said pieces of dough transversely of said belt, and means for adjusting the position of said stop member.

3. In a molding machine, a conveyor for sheeted pieces of dough, a conveyor belt traveling transversely of the direction of travel of said first conveyor and receiving pieces of dough discharged crosswise thereof from said first conveyor, a plate-like member extending over said conveyor belt to direct said pieces of dough toward said belt and a stop member extending lengthwise of said conveyor belt for limiting movement of said pieces of dough transversely of said belt.

4. In a molding machine, a conveyor for sheeted pieces of dough, a conveyor belt traveling transversely of the direction of travel of said first conveyor and receiving pieces of sheeted dough discharged onto the same crosswise thereof directly from said first conveyor, guides extending lengthwise of said belt, means for directing said pieces of dough toward said belt and a stop member overlying said belt for limiting movement of said pieces of sheeted dough transversely of said belt, said stop member having a guide thereon extending lengthwise of said conveyor belt toward one of said first mentioned guides for guiding said pieces of sheeted dough into engagement with said first mentioned guides.

5. In a molding machine, a conveyor for sheeted pieces of dough, a conveyor belt traveling transversely of the direction of travel of said first conveyor and receiving pieces of dough discharged crosswise thereof from said first conveyor directly onto the same, guides extending lengthwise of said belt, means for adjusting the position of said guides, means for directing said pieces of dough toward said belt, a stop member overlying said belt for limiting movement of said pieces of sheeted dough transversely of said belt, said stop member having a guide thereon extending lengthwise of said conveyor belt toward one of said first mentioned guides for guiding said pieces of sheeted dough into engagement with said first mentioned guides, and means pivotally connected with said stop member for adjusting said stop member independently of said first mentioned guides.

6. In a molding machine, a conveyor for sheeted pieces of dough, a conveyor belt traveling transversely of the direction of travel of said first conveyor and receiving pieces of dough discharged crosswise thereof from said first conveyor, a combined stop and guide member in the path of movement of said pieces of dough transversely of said belt and extending lengthwise of said belt, and a stop plate mounted on said guide member to extend toward said first conveyor in spaced relation to said belt.

7. In a molding machine, a conveyor for sheeted pieces of dough, a conveyor belt traveling transversely of the direction of travel of said first conveyor and receiving pieces of dough discharged crosswise thereof from said first conveyor, a combined stop and guide member in the path of movement of said pieces of dough transversely of said belt and extending lengthwise of said belt, means for adjusting said combined stop and guide member transversely of said belt, and a stop plate mounted on said guide member to extend toward said first conveyor in spaced relation to said belt.

8. In a molding machine, a conveyor for sheeted pieces of dough, a conveyor belt traveling transversely of the direction of travel of said first conveyor and receiving pieces of dough discharged crosswise thereof from said first conveyor, a combined stop and guide member in the path of movement of said pieces of dough transversely of said belt and extending lengthwise of said belt, means for adjusting said combined stop and guide member transversely of said belt, and a stop plate mounted on said guide member to extend toward said first conveyor in spaced relation to said belt, said stop plate being adjustable on said combined stop and guide member to adjust the spacing of said stop plate relative to said belt.

9. In a dough molding machine, a conveyor belt, a conveyor for sheeted dough pieces extending transversely of said belt with the discharge end thereof in laterally spaced relation to a side edge of said belt, said conveyor being mounted to discharge sheeted dough pieces endwise therefrom across said belt substantially parallel to the top face thereof toward the opposite side edge thereof, and a stationary stop member overlying said belt opposite said discharge end of said conveyor, said stop member including an upstanding stop face thereon extending lengthwise between the side edges of said belt, said stop face being adjacent the top face of said belt and having its length disposed across the path of discharge of said sheeted dough pieces and having a height sufficient to halt travel of said dough pieces across the top face of said belt and determine the location of said dough pieces between the side edges of said belt.

10. In a dough molding machine, a conveyor belt, a conveyor for sheeted dough pieces extending transversely of said belt with the discharge end thereof in laterally spaced relation to a side edge of said belt, said conveyor being mounted to discharge sheeted dough pieces endwise therefrom across said belt substantially parallel to the top face thereof toward the opposite side edge thereof, and a stationary stop member overlying said belt opposite said discharge end of said conveyor, said stop member including an upstanding continuous guide wall extending lengthwise between the side edges of said belt adjacent the top face thereof opposite the discharge end of said conveyor in a position to provide a barrier disposed across the path of discharge of said sheeted dough pieces, said wall being of sufficient length and height to halt travel of said dough pieces across the top face of said belt and determine the location of said dough pieces between the side edges of said belt.

11. In a dough molding machine, a conveyor belt, a conveyor for sheeted dough pieces extending transversely of said belt with the discharge end thereof in laterally spaced relation to a side edge of said belt, said conveyor being mounted to discharge sheeted dough pieces endwise therefrom across the top face of said belt and a stationary stop and guide member overlying said belt between the side edges thereof, said stop and guide member having a flat upstanding stop face extending lengthwise of said belt, said stop face being disposed across the path of discharge of said sheeted dough pieces and having an extent lengthwise of said belt sufficient to halt travel of said dough pieces across the top face of said belt and determine the location of said dough pieces between the side edges of said belt.

12. In a dough molding machine, a conveyor belt, a conveyor for sheeted dough pieces extending transversely of said belt with the discharge end thereof in laterally spaced relation to a side edge of said belt, said conveyor being mounted to discharge sheeted dough pieces endwise therefrom across the top face of said belt, a stationary stop and guide member overlying said belt between the side edges thereof, said stop and guide member having a flat upstanding stop face extending lengthwise of said belt, said stop face being disposed across the path of discharge of said sheeted dough pieces and having an extent lengthwise of said belt sufficient to halt travel of said dough pieces across the top face of said belt and determine the location of said dough pieces between the side edges of said belt, supporting means adjacent said belt and means for mounting said stop and guide member on said supporting means for adjustment angularly relative to the direction of travel of said conveyor belt.

13. In a dough molding machine, a conveyor belt, a conveyor for sheeted dough pieces extending transversely of said belt with the discharge end thereof in laterally spaced relation to a side edge of said belt, said conveyor being mounted to discharge sheeted dough pieces endwise therefrom across the top face of said belt, a stationary stop and guide member overlying said belt between the side edges thereof, said stop and guide member having a flat upstanding stop face extending lengthwise of said belt, said stop face being disposed across the path of discharge of said sheeted dough pieces and having an extent lengthwise of said belt sufficient to halt travel of said dough pieces across the top face of said belt and determine the location of said dough pieces between the side edges of said belt, supporting means adjacent said belt and means for mounting said stop and guide member on said supporting means for adjustment relative to the marginal edges of said belt including a slidable connection between said supporting means and stop and guide member and clamping means for holding said slidable connection against sliding.

MERLIN A. STICELBER.

References Cited in the file of this patent

UNITED STATES PATENTS

| Number | Name | Date |
|---|---|---|
| 787,274 | Burns | Apr. 11, 1905 |
| 806,869 | Burns | Dec. 12, 1905 |
| 1,657,018 | Larraburu | Jan. 24, 1928 |
| 1,674,229 | Scruggs | June 19, 1928 |
| 1,816,844 | Harber | Aug. 4, 1931 |
| 1,988,047 | Peters | Jan. 15, 1935 |
| 2,021,251 | Brykczynski et al. | Nov. 19, 1935 |
| 2,036,531 | Kosman et al. | Apr. 7, 1936 |
| 2,077,896 | Quick | Apr. 20, 1937 |
| 2,135,778 | Wyland | Nov. 8, 1938 |
| 2,320,797 | Robinson | June 1, 1943 |
| 2,373,012 | Burdett et al. | Apr. 3, 1945 |